July 8, 1952          R. W. MILLER          2,602,647
TUBULAR CONTACTOR WITH CONICAL DISTRIBUTION PLATE
Filed March 30, 1951
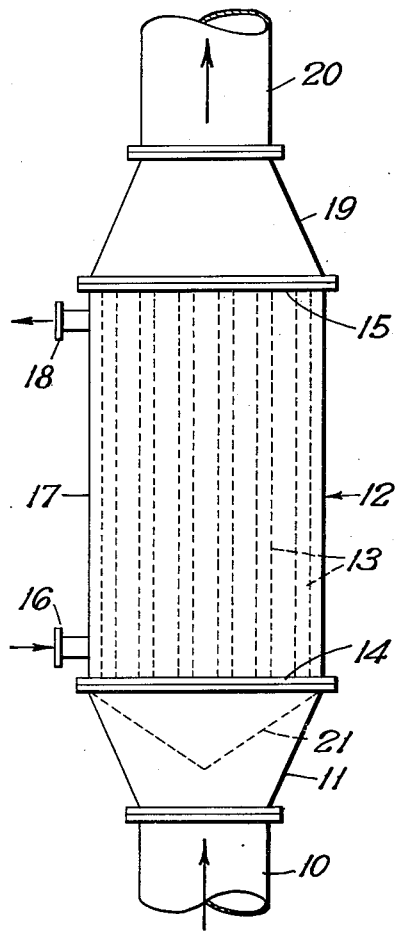
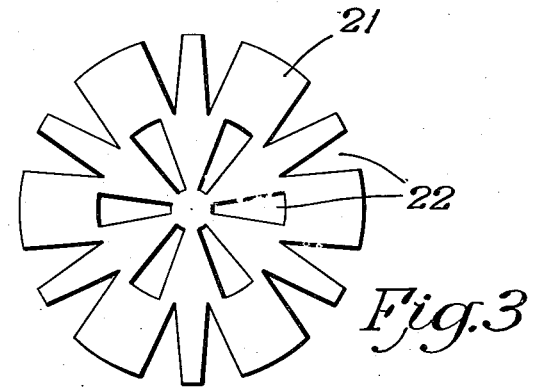
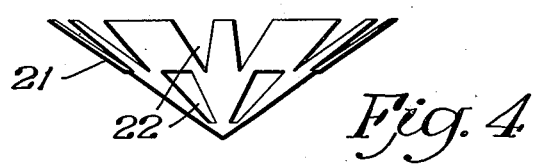
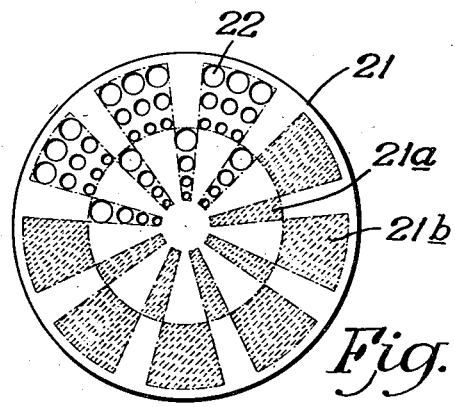
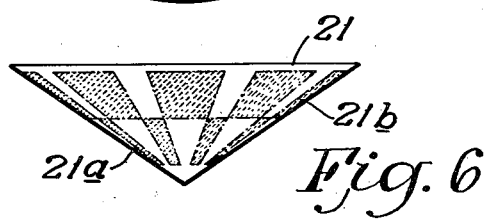
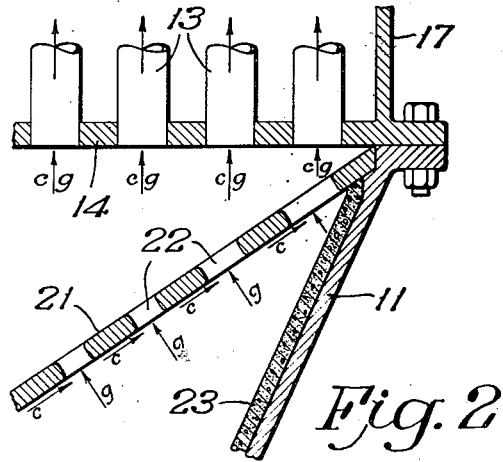
INVENTOR.
Roy W. Miller
BY
Everett A. Johnson
ATTORNEY Patented July 8, 1952

2,602,647

UNITED STATES PATENT OFFICE 2,602,647

TUBULAR CONTACTOR WITH CONICAL DISTRIBUTION PLATE

Roy W. Miller, Hammond, Ind., assignor to Standard Oil Company, Chicago, Ill., a corporation of Indiana Application March 30, 1951, Serial No. 218,479

11 Claims. (Cl. 257—224)

This invention relates to method and means for providing contact between gasiform fluids and finely divided solid materials. More particularly the invention relates to distributing a heterogeneous dense turbulent suspended mixture of gasiform fluid and finely divided solids through a bundle of tubes.

It has long been recognized that a mass of finely divided solid materials can be carried upwardly by a gas to provide a fluidized bed of finely divided solid materials and to provide intimate contact of the gases and the finely divided solids. It has also been proposed that such a fluidized mass be divided into a plurality of columnar bodies for the purpose of indirect heat exchange. However, it has been observed that in supplying a heterogeneous suspended mixture of finely divided solids and carrier gas from a single conduit to a plurality of parallel tubular conduits, there is unequal distribution of the finely divided solids and gases through the bundle of tubes.

The solids in this heterogeneous mixture exhibit their own special flow characteristics while the fluid component behaves in a wholly different manner. For example, when a flowing solid emerges from a pipe section of small diameter to a conduit concentrically of larger diameter, such as a bundle of tubes, the solids obey the laws of motion and tend to continue in their normal path as restricted by the smaller pipe. The fluid, being less dense than the suspended solids, reaches the peripheral area of the larger conduit in preference to the solid particles. This phase separation, although not sharp, gives a variable solids-to-fluid distribution across the larger conduit or bundle, with more solids flowing through the center tubes and the majority of the fluid through the outer or peripheral tubes. The solids flowing through the center tubes, being the denser material, causes a greater static pressure drop than the fluid at the outer tubes. Therefore the fluid in the outer tubes must make up in velocity pressure drop the difference in static head caused by the more dense solids in the central tubes, which means a greater velocity for the fluid in the outer tubes of the cooler than in those near the center. This flow maldistribution causes many complications. It greatly increases the erosion of the outer tubes of the cooler due to the fact that the erosion factor varies approximately as the cube of the velocity and the first power of the density. Likewise, the tube sheet is subject to severe erosion. Furthermore, the uneven flow through the heat exchanger bundle causes variance in heat transfer through the tubes since the velocity, the heat capacity, and the exit temperatures will vary from tube to tube.

It is therefore an object of this invention to provide a method and means for introducing heterogeneous mixtures of gasiform fluids and solids uniformly across the entire flow area of a contacting chamber. Another object of the invention is to provide method and means for supplying such heterogeneous mixtures to a bundle of parallel tubes with a minimum erosion of the tubes located on the periphery of the bundle. A further object is to provide a contacting chamber which permits effective and controlled contact of finely divided solids and gasiform fluids with a minimum pressure drop caused by the uneven flow of finely divided solids through the tubes. An additional object is to provide an apparatus which permits higher heat transfer rates between cooling fluids and heterogeneous mixtures of solids and carrier gases by maintaining uniform flow and temperature gradients across the contacting chamber.

A more specific object of the invention is to provide an improved contacting chamber for controlling the temperature of a heterogeneous mixture of finely divided solids and gasiform fluids and for maintaining effective heat transfer from such a fluidized mixture. Other objects will become apparent as the detailed description of my invention proceeds.

It has heretofore been proposed to minimize the defects outlined above by employing a grid or perforated plate for supporting the finely divided solids and for introducing the gasiform fluid at uniformly spaced points across the flow area of the contacting vessel. Nevertheless contactors for fluidized masses of finely divided solids of this general type have suffered from a number of major difficulties. In addition to inlet and grid fouling, erosion of the grid orifices, of the tube bundle and of the tube sheet has been severe.

These difficulties are especially pronounced in a catalyst cooler of a fluid catalytic cracking unit. Such a catalyst cooler is used for the purpose of cooling the catalyst and recycling it to the regenerator for temperature control therein. In most instances the catalyst, e. g. finely divided clay, silica, alumina and the like, and air flow through a pipe of small diameter and emerge into tubes of a cooling section bundle in a larger diameter pipe. The large pipe does not necessarily have a larger net flow area than the small pipe, since a tube sheet extends across the bundle diameter with tubes in which the catalyst and air flow for heat exchange purposes with a liquid in the tank surrounding the tubes.

The catalyst being more dense than the air continues in its normal path through the central group of tubes in the cooler and the air being more easily displaced laterally travels preferentially to the outer or peripheral tubes. This phase separation is not sharp but ample to give a variable catalyst-to-air distribution throughout the catalyst cooler with more catalyst flowing through the central tubes and the bulk of the air through the outer tubes. The catalyst flowing through the center tubes causes a greater static pressure drop than the air through the outer tubes. Consequently, there is a bypassing by the air at a high velocity with a dilute suspension or heterogeneous mixture of catalyst through the peripheral tubes. This uneven flow distribution causes excessive erosion on the tubes located at the periphery of the cooler; increases pressure drop through the tubes; and reduces the heat transfer rate.

Briefly, I attain the objects of my invention and eliminate the described difficulties by providing a tapered or inverted conical baffle containing a plurality of ports, the areas of which are proportional to the tube area above at any radial distance. The inverted conical baffle is placed at the inlet of the large conduit and is constructed so that the catalyst-air mixture is evenly distributed to the tubes. The conical shape of the dispersing device maintains continuous uniform flow.

The conical sheet is drilled or slotted in such a manner that the vertical projected area of the slots or ports in the conical sheet is proportional to the incremental tube area above a given section of the conical baffle. The open or flow area through the conical sheet is equal to or greater than the total cooler tube area.

The catalyst which strikes the solid portion of the conical sheet is directed outward and upward until it finds an opening through which it may flow, the area of this opening being proportional to the number of tubes located above. With this type of baffle control, the heterogeneous mixture of catalyst and air is uniformly distributed across and within the individual tubes of the catalyst cooler.

The details of construction and configuration of the apparatus will be apparent from the following description taken with the accompanying drawings wherein:

Figure 1 is an elevation of a contactor employing my conical dispersing baffle;

Figure 2 is a partial section of the apparatus of Figure 1;

Figures 3 and 4 are top and side views, respectively, of one embodiment of the conical baffle; and Figures 5 and 6 are top and side views, respectively, of another embodiment of the conical dispersing baffle.

Referring to the drawing, my apparatus comprises an inlet line 10 merging with a tapered section 11 which is flared upward and outward to the full diameter of the contactor 12. The main body of the contactor or cooler 12 is formed of a bundle of tubes 13 between a lower tube sheet 14 and upper tube sheet 15 in a shell 17. These tubes 13 may be from about 1.0 inch to 3.0 inches in diameter and they are surrounded by a cooling liquid such as water which may be introduced into shell 17 through line 16. The heat extracted from the heterogeneous mixture of gases and solids flowing in tubes 13 converts the water to steam which is withdrawn through line 18. The stream of gases and solids from the individual tubes 13 are commingled within tapered reducing section 19 and withdrawn by transfer conduit 20.

The dispersing plate 21 is provided with a plurality of ports 22, the aggregate area thereof at any radial distance from the center being proportional to the total number of tubes 13 thereabove. The angle of the cone or dispersing plate 21 should be such as to approximately bisect the angle formed by the tube sheet 14 and the sloping wall of the reducing section 11 between the inlet pipe 10 and the cooler shell 17. The angle formed by the conical distributing plate 21 will vary between about 15 and 45 degrees measured from the tube sheet 14, the preferred angle being that which bisects the angle formed by the tube sheet 14 and the wall of the reducing section 11.

An important advantage of this type of distribution plate 21 is to attain uniform distribution of the solids as well as of the carrier gas. The conical shape of the plate 21 provides an outer deflecting surface for the flowing solid c as shown in Figure 2, and the distribution of the ports 22 causes the bulk of the flowing solid to move to the outer edge of the plate 21.

The distribution and spacing of the slots or ports 22 in the distribution plate 21 are critical. The area of the ports 22 at any radial distance from the center is proportional to the flow area of the tubes 13 downstream. When the tubes 13 in the bundle are evenly spaced and symmetrically arranged, the proportional area of the ports 22 will vary directly as the distance from the center of the plate 21. In addition, the ports 22 are spaced about the surface of the conical distributing plate 21 so as to deflect the desired proportion of the flowing solids toward the outer edge 21a of the plate 21. The annular surface of the plate is provided with ports 22 having a total area of from 1.0 to 3.0 times the flow area of the tubes 13 in the bundle. In the preferred arrangement, the area of the ports 22 is equal to the total flow area of the tubes 13 in the bundle. The tubes 13 are arranged in symmetrical concentric groups within the contactor 12.

The total area of the ports 22 at a given level within the conical dispersing plate 21 is proportional and preferably equal to the total area of the tubes 13 in the bundle.

The port area in the conical plate 21 at any height $H_x$ measured from the base of the cone can be defined by the expression $$\frac{TC}{R^2}(R - H_x \cot \theta^2)$$

where $T$ = total tube area in sq. in.
$H_x$ = height of annular section $21b$ of cone
$R$ = radius of base of conical dispersing plate and shell 17
$\theta$ = angle between tube sheet 14 and conical plate 21
$C$ = port area/tube area A typical contactor of the type described in the drawing comprises a vertical chamber 17 which may be about 7.5 feet in diameter and about 17 feet in height. The inlet conduit 10 may be about 4 feet 4 inches in diameter and the outlet or transfer line 20 is of corresponding size. The individual tubes 13 within the shell 17 may be about 7.5 feet in length and about 1⅞ inches in diameter. About 580 of these tubes 13 may be symmetrically arranged between tube sheets 14 and 15 on a square pattern. The dispersing plate 21 has a diameter or base corresponding to the inside diameter of the shell 17 and may be mounted at the top of the reducing section 11 as shown in Figure 2. The tapered section 11 may be about 8 feet long and is preferably lined with a protective material 23 such as "Gunnite."

It will be seen in Figures 3 and 4 and Figures 5 and 6 that the area of the ports 22 is substantially greater toward the periphery of the dispersing plate 21. The gases g, pass through the ports 22 substantially normal to the conical plane surface of the plate 21 whereas the catalyst c has a tendency to travel outwardly and upwardly along the surface of the dispersing plate 21 until it reaches a port 22 after which the particle tends to travel vertically upward into a tube 13.

In Figures 5 and 6, I have illustrated a drilled type plate 21. The ports 22 are shown as varying in size but it is contemplated that the holes can be of the same diameter but spaced to obtain the correct open area for any radial distance from the apex of the conical plate 21. The diameter of the ports 22 may be 0.5 to 2 or 3 times the diameter of the tubes 13. In the illustrated apparatus, the inlet pipe 10 has a flow area about equal to the flow area of the tubes 13 in the bundle within shell 17. Therefore, the area of the drilled ports 22 in the subcone 21a having a base area equivalent to the inlet pipe 10 is only one-fourth the area of the inlet pipe 10. The remaining 75% of the drilled area is in the annulus or peripheral edge 21b of the distribution plate 21. It should be noted that in the area of the conical plate 21 covered by the smaller inlet pipe 10, 75% of the solid surface is used to deflect the flowing solid c to the ports 22 in the outer edge 21b and only one-fourth of the flowing solid will therefore enter the ports in the central area 21a. In this manner, 75% of the solids flowing to the central conical section 21a will be deflected to the peripheral tubes 13 in the bundle and approximately only 25% will flow through the center tubes of the bundle.

Inasmuch as the catalyst particles c are traveling in a direction parallel to the tubes and perpendicular to the tube sheet 14, erosion of the tubes 13 and of the tube sheet 14 is minimized. It has been established that erosion of the plate and tube is greatest when impingement is at an angle substantially less than 90 degrees and more than 5 to 10 degrees. Thus, by directing the heterogeneous stream substantially perpendicularly to the tube sheet 14 and in alignment with the longitudinal axis of the cooling tubes 13, erosion is reduced to a minimum.

Likewise, by distributing the stream to the peripheral tubes 13, a balanced condition is maintained throughout all of the tubes regardless of their position within the bundle. This balanced operation likewise reduces erosion by reducing the velocity of the flow through any tube or group of tubes.

In general, a velocity below about 20 feet per second will not permit a stable fluid flow through the cooler tubes 13. Conversely velocity flow above about 35 feet per second causes excessive erosion. By the use of my catalyst dispersing plate 21, however, stable fluid flow can be obtained at the lower end of this range of between about 20 and 35 feet per second, thereby obtaining optimum heat transfer rates, reducing erosion to a minimum, and substantially eliminating the bypassing of any tube or group of tubes due to unequal distribution of solids and gases across the bundle of tubes.

Although I have described my invention in terms of specific examples which are set forth in considerable detail, it should be understood that these are by way of illustration only and that the invention is not limited thereto, since alternative embodiments and operating techniques will become apparent to those skilled in the art in view of my disclosure. Accordingly, modifications of my invention are contemplated without departing from the spirit of the described invention or from the scope of the appended claims.

I claim:

1. An apparatus adapted to effect heat exchange between a heterogeneous stream of gasiform fluid and finely divided solids which comprises a generally cylindrical shell, a bundle of parallel tubes arranged between upper and lower tube sheets within said shell, a reducing section at each end of said shell, an inlet conduit and an outlet conduit communicating with the respective reducing sections, the improvement which comprises a conical distribution plate having a ported central conical section and a ported outer annular conical section, the ports in said central conical section and said annular conical section being circumferentially offset so as to provide a substantial deflecting surface on said central section extending to the ports in the annular section.

2. The apparatus of claim 1 wherein the area of the ports in the distributing plate is proportional to the area of the tubes immediately above the plate.

3. The apparatus of claim 1 wherein the conical distribution plate is disposed at an angle of between about 15 and 45 degrees with respect to the lower tube sheet.

4. The apparatus of claim 1 wherein the conical distribution plate bisects the angle between the tube sheet and the wall of the reducing section adjacent the inlet to said shell.

5. The apparatus of claim 1 wherein the ports comprise a plurality of tapered slots.

6. The apparatus of claim 1 wherein the ports comprise a plurality of substantially circular openings arranged in symmetrical radial groups.

7. The apparatus of claim 1 wherein the surface of the central conical section comprises about 55 to 75 percent imperforate area and about 45 to 25 percent port area, and wherein the annular section comprises about 55 to 75 percent port area and about 45 to 25 percent imperforate area.

8. In an apparatus for flowing a heterogeneous stream of gasiform fluids and finely divided solids through a bundle of parallel tubes, the improvement which comprises a ported conical distributing plate having its apex directed upstream, said conical plate having a central portion wherein the solid area predominates over the port area and an annular portion wherein the port area predominates over the imperforate area.

9. The apparatus of claim 8 wherein the proportion of port area to imperforate area in the central portion and in the annular portion is directly proportional to the number of tubes above the distributing plate within the respective central portion and annular portion.

10. The apparatus which includes a bundle of parallel tubes arranged between tube sheets within a shell adapted to circulate a heat transfer medium about said tubes, the improvement which comprises a conical distributor plate arranged below the bundle of tubes, said plate comprising a central conical portion and a merging annular truncated conical portion having a slope at an angle of between about 15 and 45 degrees with respect to the adjacent tube sheet, a plurality of ports in said plate, the area of said ports progressively increasing from the apex to the base of the said conical plate, and substantially imperforate portions of said central portion deflecting solids upwardly and outwardly to the ports in the said annular portion.

11. The method of heat transfer from a heterogeneous stream of finely divided solids suspended in a gasiform fluid which comprises the steps of passing said stream upwardly through a heat exchange zone including a bundle of heat exchange tubes, and preventing a phase separation between said solids and gasiform fluid prior to introduction of said stream to said bundle by deflecting about 75 percent of the solids upwardly and outwardly to a peripheral portion and passing about 25 percent of the solids through a central portion of the heat exchange zone.

ROY W. MILLER.

REFERENCES CITED

The following references are of record in the file of this patent:

UNITED STATES PATENTS

| Number | Name | Date |
|---|---|---|
| 501,479 | Keiser | July 11, 1893 |
| 1,718,984 | Schramm | July 2, 1929 |
| 2,343,542 | Faunce | Mar. 7, 1944 |
| 2,548,312 | Kaufman | Apr. 10, 1951 |

FOREIGN PATENTS

| Number | Country | Date |
|---|---|---|
| 531,035 | France | Oct. 13, 1921 |